United States Patent
Qi et al.

(10) Patent No.: US 9,928,245 B2
(45) Date of Patent: Mar. 27, 2018

(54) METHOD AND APPARATUS FOR MANAGING MEMORY SPACE

(71) Applicant: EMC Corporation, Hopkinton, MA (US)

(72) Inventors: Wei Qi, Beijing (CN); Junping Zhao, Beijing (CN); Fenghua Hu, Beijing (CN); Gang Xie, Beijing (CN); Jialin Yang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 37 days.

(21) Appl. No.: 14/143,312

(22) Filed: Dec. 30, 2013

(65) Prior Publication Data
US 2014/0189267 A1    Jul. 3, 2014

(30) Foreign Application Priority Data

Dec. 31, 2012   (CN) .......................... 2012 1 0596218

(51) Int. Cl.
| | | |
|---|---|---|
| G06F 12/00 | (2006.01) | |
| G06F 17/30 | (2006.01) | |
| G06F 13/00 | (2006.01) | |
| G06F 13/28 | (2006.01) | |

(52) U.S. Cl.
CPC ............... G06F 17/30088 (2013.01)

(58) Field of Classification Search
CPC ..................... G06F 17/30088; G06F 9/5016
USPC ......................................................... 711/158
See application file for complete search history.

(56) References Cited

U.S. PATENT DOCUMENTS

| | | | | |
|---|---|---|---|---|
| 8,171,246 | B2 * | 5/2012 | Balasubramanian | ......... 711/162 |
| 8,219,777 | B2 * | 7/2012 | Jacobson et al. | ............. 711/203 |
| 2003/0220948 | A1 * | 11/2003 | Green et al. | .................. 707/204 |

* cited by examiner

Primary Examiner — Mark Giardino, Jr.
(74) Attorney, Agent, or Firm — Krishnendu Gupta; Konrad R. Lee (57) ABSTRACT

Embodiments of the present invention relate to a method, apparatus and computer product for managing memory space. In one aspect of the present invention, there is provided a method for managing memory space that is organized into pages, the pages being divided into a plurality of page sets, each page set being associated with one of a plurality of upper-layer systems, by: performing state monitoring to the plurality of upper-layer systems to assign priorities to the plurality of upper-layer systems; and determining an order of releasing the pages of the memory space based on the priorities of the plurality of upper-layer systems with the page sets as units. Other aspects and embodiments of invention are also disclosed.

20 Claims, 4 Drawing Sheets

METHOD AND APPARATUS FOR MANAGING MEMORY SPACE

RELATED APPLICATION

This application claims priority from Chinese Patent Application Serial No. CN201210596218.9 filed on Dec. 31, 2012 entitled "METHOD AND APPARATUS FOR MANAGING MEMORY SPACE," the content and teachings of which are hereby incorporated by reference in their entirety.

FIELD OF THE INVENTION

Embodiments of the present invention generally relate to storage management, and more specifically, to managing memory space.

BACKGROUND OF THE INVENTION

Memory management, especially managing space in a memory, for example, when creating a snapshot for a file system or a virtual machine system, has gained prominence in current times. It is generally known to those skilled in the art that snapshot is a technique for system protection, which may save all states, data, and context of a system at any given instant of time. Snapshot operation is therefore critical to fault recovery of a system. For example, when a system has encountered an error during operation, it may be appropriate to recover it to the state and context at the time of creating the snapshot.

For example, consider a file system, a common snapshot created runs in at a volume level of the file system and manages snapshot relationship (i.e., metadata of the snapshot) at block granularity. Typically could be many snapshots (up to thousands of levels) in a file system, which could consume a considerable amount of memory to store metadata. For example, one snapshot of a 2 TB production file system could theoretically consume easily about 4 GB memory to store the metadata. Thus, in general the snapshot metadata are not completely stored in the memory, but might be "swapped in" and/or "swapped out" dynamically at runtime from an external memory device such as a disk. Alternatively, snapshots in a system may share a global memory space quota, but not all snapshots are equal, and some snapshots (generally the most recent snapshots) are considered to be more important and critical than the other snapshots. Such instances lead to several challenges especially for management of memory space. In order to guarantee an overall efficiency and performance (typically to reduce high CPU consumption), it may be desirable for managing memory space more efficiently.

Traditionally two common management approaches are known for memory management of file system snapshots:
1) all snapshot file systems share a single global memory management application (for example, paging daemon), and the pages in the memory are simply swapped according to the Least Recently Used (LRU) rule; or
2) each file system has its own memory space management application and manages the memory space independent of each other.

For the first approach, a single paging process is likely to be a bottleneck, generally in a large scale environment. The extensive IO (input/output) workload is likely to cause the memory space to reach an upper threshold of the quota (high watermark). Besides, this approach lacks in capabilities with respect to Quality of Service (QoS) management. For the second approach, without sufficient coordination between file systems, a signal paging process will encounter the case of dramatic jitter of the memory utilization rate. For example, too many blocks might be swapped out in parallel by the paging daemon, and then immediately swap in may be requested by coming reads, which tends to causes too many disk I/Os and thereby lowers the swap efficiency. Besides, another challenge lies with the difficult to work out an efficient, definite and luminous rule to divide out budgets among file systems and enable QoS.

In summary, in the traditional memory space management methods, the swap in/swap out decisions of pages in the memory are made without knowing the overall system state. It is sometimes not possible to guarantee that a relatively high importance file system has a corresponding priority consideration in the memory management. Meanwhile, in traditional implementation, for sake of simplicity, typically all snapshot metadata share a global LRU list and memory page management is executed by a single thread, which is likely cause a bottleneck and result in high CPU consumption and lacks scalability. These drawbacks exist in other fields such as virtual machine memory management as well.

SUMMARY OF THE INVENTION

Embodiments of the invention disclose a method, apparatus and computer program for managing memory space, which advantageously ameliorate one or more of the drawbacks listed above.

Embodiments of the present invention disclose a method and computer program product for managing memory space. The memory space is organized into pages, which are further divided into a plurality of page sets, each page set being further associated with one of a plurality of upper-layer systems. The method advantageously includes monitoring a plurality of upper-layer systems to assign priorities to the plurality of upper-layer systems; and determining an order of releasing the pages of the memory space based on the priorities of the plurality of upper-layer systems with the page sets as units.

In a further embodiment, there is provided an apparatus for managing memory space. The memory space is organized into pages, which are divided into a plurality of page sets, each page set being associated with one of a plurality of upper-layer systems. The apparatus includes a state monitoring unit configured to perform state monitoring to the plurality of upper-layer systems to assign priorities to the plurality of upper-layer systems; and an order determining unit configured to determine an order of releasing the pages of the memory space based on the priorities of the plurality of upper-layer systems with the page sets as units.

Other embodiments are also disclosed.

It would be understood from the following description below that by virtue of the exemplary embodiments of the present invention, the granularity of managing the memory space is not only limited to the usage situation of the memory pages, but may also consider the upper-layer system. This would provide another two-layered mechanism of managing memory space. First, a to-be-released memory space area is determined from an upper-layer system level such as a higher level file system, and then, the recent usage situation of the memory is considered in the area.

This way, the task assignment role and the task execution role for managing memory space are separated. The task assignment portion handles the overall monitoring and paging task assignment, such that its workload becomes lighter and more intelligent, while the paging execution portion will execute the task of managing memory space in parallel with the management portion. Meanwhile, each paging execution portion is thoroughly independent of other paging execution portion and is easily scalable, thereby avoiding the bottleneck of a single paging process and significantly reducing lock contention and high CPU consumption.

In some alternate embodiments, the weight and priority design may manage the memory space more intuitively and efficiently, while QoS support enables the administrator to instantaneously adjust parameters. For example weight and priority and not limited to these, thereby promptly responding to different demands. Besides, a smart paging task assignment based on policy and weight will assign tasks based on the current usage state and normalized weight of the current memory space, which results in efficient assignment, and the memory space occupied by some snapshots with low usage frequency or having larger memory space consumption are typically released on priority, and; further, it may avoid I/O fluctuation.

BRIEF DESCRIPTION OF THE SEVERAL VIEWS OF THE DRAWINGS

Features, advantages, and other aspects of various embodiments of the present invention will become more apparent through the following detailed description with reference to the following drawings. Wherein.

DETAILED DESCRIPTION OF THE INVENTION

Hereinafter, various exemplary embodiments of the present invention will be described in detail with reference to the drawings. The flowcharts and block diagrams in the figures illustrate potential realizable architecture, function, and operation of the method and system according to various embodiments of the present invention. It should be noted that each block in the flowcharts or block diagrams may represent a module, a program segment, or a part of code, which may contain one or more executable instructions for implementing logic functions as prescribed in various embodiments. It should also be noted that, in some alternative implementations, the functions indicated in the blocks may also occur in an order different from what is indicated in the drawings. For example, two blocks shown consecutively may be performed in parallel substantially or in an inverse order, depending on the functions involved. It should also be noted that each block in the flow charts and/or block diagrams and a combination of the blocks in flow charts and/or block diagrams may be implemented by a dedicated hardware-based system for executing prescribed functions or operations or may be implemented by a combination of dedicated hardware and computer instructions.

It should be understood that provision of these embodiments is only to enable those skilled in the art to better understand and further implement the present disclosure but not to limit the scope of the present disclosure in any manner.

According to an exemplary embodiment of the present invention, a to-be-managed memory space is organized into pages, and the pages are divided into a plurality of page sets, each page set being associated with one of a plurality of upper-layer systems. The upper-layer systems for example may comprise a file system or a virtual system or the like. In the following embodiments, the method and apparatus according to the present disclosure will be described with a file system as an example, wherein the page sets correspond to snapshots in the file system. It should be understood that the method and apparatus of the present disclosure are likewise applicable to other systems involving memory space management, such as a virtual machine system.

Figure 1:
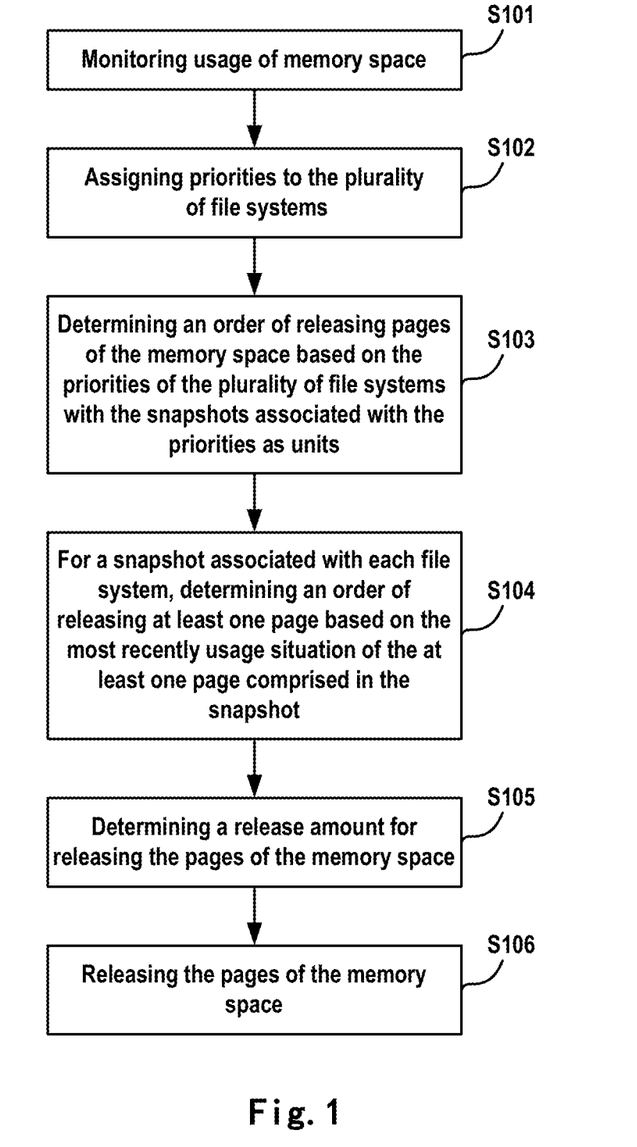
FIG. 1 is a flowchart of a method for managing memory space according to an exemplary embodiment of the present invention.

Reference is now made to FIG. 1, a flowchart representative of a method for managing memory space according to an exemplary embodiment of the present invention.

Step S101 illustrates monitoring usage of memory spaces, specifically the usage state and usage situation of upper-layer systems are monitored. As an example, snapshots of a file system are created according to the embodiments of the present invention, wherein the monitored system states may comprise one of the following: counts of snapshots of one or more file systems within a predetermined period of time, memory consumption of the snapshots, and predefined QoS settings, etc.

Next, in step S102, priorities are assigned to the plurality of file systems based on the monitoring of the states of the plurality of file systems. According to the exemplary embodiments of the present invention, a higher priority is assigned to a file system which performs a most recent snapshot operation or performs snapshot operations more frequently. A priority of some file systems may be directly set based on a quality of service (QoS). For example, for a file system which is used less or whose performance is not considered to be important, a lower priority may be manually set. In particular, when performing memory space management in the snapshot application, the priority of a file system may also be determined based on a snapshot weight of the file system. Embodiments in relation to this aspect will be described below.

It should be noted that, according to the embodiments of the present invention, assignment of priority to the upper-layer systems may be performed continuously based on the state monitoring in step S101. Alternatively, the assignment of priority to upper-layer systems may be executed periodically. As another example, in some alternative embodiments, a lower threshold (which is called "low water mark"), for example 60% of the memory space quota, for the memory space quota, may be set; the assignment of release order in step S102 and the subsequent operations are executed only when usage of the memory space exceeds the lower threshold.

In step S103, an order of releasing the pages of the memory space is determined based on the priorities of a plurality of file systems with the page sets associated with the file system as the units. In other words, according to the embodiments of the present invention, when managing the memory space, the release order is not simply determined based on the page usage situation in the memory space. On the contrary, the release order of pages is firstly considered based on the priority of the file system.

For example, suppose the priority associated with a first file system is higher than a second file system, in which case the overall priority of a first page set associated with the first file system is higher than a second page set associated with the second file system. In other words, when a requirement arises to release pages, the pages in the second page set will be released prior to the first page set, even if some pages in the second page set are more frequently used than the pages in the first page set.

Particularly, in relation to exemplary embodiments of the present invention, releasing the memory space includes swapping out pages in the memory space. It should be understood that the manner of releasing memory space is not limited to swap-out of pages, but may include any feasible manner including directly deleting the contents within the pages. The scope of the present invention is not limited thereto.

In an alternative step S104, for a page set associated with each file system, an order of releasing at least one page included in the snapshot may be determined based on the most recent usage situation of the at least one page. For example, the release order of pages may be determined or specified in accordance with a LRU rule or based on QoS. It should be noted that this is only exemplary. For the pages in each page set, its release order may be determined based on various other parameters, for example, the pages may be released simply in an ascending order based on the serial numbers of the pages. Besides, the release order of the pages in each page set may be pre-specified by the user, or may occur in any other manner.

In some embodiments, the page sets associated with a plurality of upper-layer systems share the same memory space quota. In other words, the total memory space volume available to such page sets is fixed. In these embodiments, in an alternative step S105, the release amount for releasing the pages in the memory space may be determined. In other words, in accordance with the embodiments of the present invention, besides determining the release order of the page sets associated with each upper-layer system, the release amount of these page sets can also be determined. In general, the released page amount for releasing the page sets with a front order (the priority of the associated upper-layer system is relatively low) is relatively higher; while the released page amount for releasing the page sets with a later order (the priority of the associated upper-layer system is relatively high) is relatively lower.

According to some embodiments of the present invention, a ratio of the storage capacity of the released pages as required for each page set to the shared memory space quota may be determined. For example, the page storage capacity as released by an earlier released page set has a higher ratio to the memory space quota, and the page storage capacity as released by a later released page set has a lower ratio to the memory space quota.

According to some embodiments of the present invention, a threshold, i.e., a lower threshold and an upper threshold, may be set for the memory space quota for comparing with usage of the memory space, thereby determining the release amount of the pages of the memory space. For example, referring to FIG. 2, according to the embodiments of the present invention, the lower threshold (low water mark) is 60% of the memory space quota, while the upper threshold (high water mark) is 80% of the memory space quota.

Figure 2:
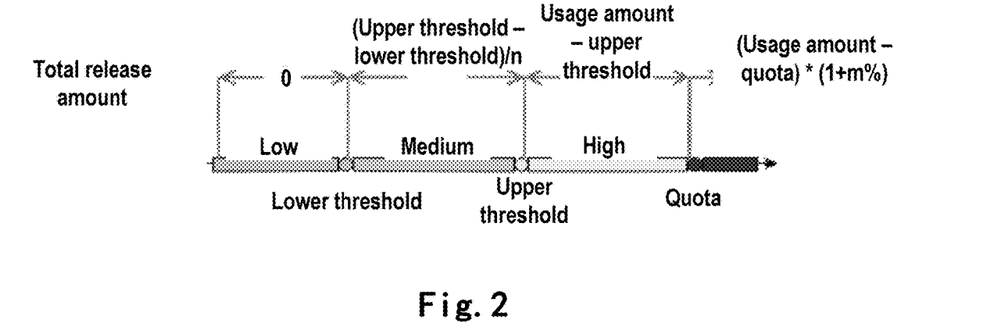
FIG. 2 is a schematic diagram of a release amount of a page of releasing memory space according to an exemplary embodiment of the present invention.

According to an exemplary embodiment of the present invention, the release amount of the pages for releasing the memory space for example may be determined from one or more of the following rules detailed below:
1. All file systems share a memory space quota.
2. If the usage amount of the memory space is lower than the lower threshold, no release is performed.
3. If the range of the usage amount of the memory space is between the lower threshold and the upper threshold, then (upper threshold—lower threshold)/n pages will be released at a predetermined interval (for example, m seconds).
4. If the range of usage amount of the memory space is between the upper threshold and the memory space quota, then (usage—upper threshold) pages will be swapped out in predetermined intervals (for example every x seconds).
5. If the usage amount of the memory space is higher than the quota, then (usage amount—quota)*(1+y) pages will be released.

In the above-mentioned rules n, m, x, and y may be either automatically determined and adjusted based on study of historical data or manually specified by a user/administrator.

According to an exemplary embodiment of the present invention, a release amount of the pages for releasing the memory space corresponding to the snapshot may be determined based on the weight of the snapshot of the file system. For example, where the weight is higher, the release amount of the pages for releasing the memory space may be higher. The factors that may be used to determine the weight of a snapshot for example include the counts of snapshot operations within a predetermined period (for example, the latest or most recent X minutes), memory space required for snapshot operations, QoS settings associated with the file system, etc.

According to an exemplary embodiment of the present invention, in memory space management for a file system snapshot, an equation for calculating the weight of the snapshot may be as follows:

$$W(\text{relative weight of the snapshot}) = W_s * Ws\% + W_b * Wb\%, \quad (1)$$

wherein a higher weight corresponds a greater page release amount. In Equation (1), $$Ws = \cfrac{1}{\substack{\text{amount of data blocks consumed} \\ \text{by file system } i \text{ snapshots in a unit time}}} \Bigg/ \sum_{i=0}^{n} \cfrac{1}{\substack{\text{amount of data blocks consumed} \\ \text{by file system } i \text{ snapshots in a unit time}}}, \quad (2)$$

Therefore, in a unit time, the memory space corresponding to the snapshot of the file system consuming less data block amount should be released with more pages. Besides, $$W_b = \cfrac{\text{page count occupied by snapshots of a file system}}{\sum_{i=0}^{n} \text{page count occupied by snapshots of a file system}}, \quad (3)$$

Thus, the memory space corresponding to the snapshot with a larger memory space for the snapshot operation should be released with more pages, where Ws % denotes a relative factor for highlighting the snapshot operation, for example, which may be 67%; Wb % is also a relatively factor, which for example may be 33%.

According to an exemplary embodiment of the present invention, the page release amount for releasing with respect to a file system will be (the total released amount*W), wherein W denotes the relative weight of the snapshot of the file system.

Continuing to refer to FIG. 1, in step S106, the pages in the memory space are released based on the order of releasing the pages of the memory space in a unit of snapshots as determined in step S103, the order of releasing at least one page in the snapshots as determined in step S104, and the release amount as determined in step S105. As mentioned above, the manner of releasing pages of the memory space includes page swap-out and deleting contents in the pages, or any feasible manner.

According to an exemplary embodiment of the present invention, release of the pages of the memory space may be performed sequentially for a plurality of file system according to the priorities, or proportionally for a plurality of file systems according to the priorities. The specific release manner is dependent on the actual needs.

The above describes a method for managing memory space according to an exemplary embodiment of the present invention with reference to FIG. 1. It should be understood that description of those steps does not require or imply that the desired result can only be achieved by executing all illustrated operations. Additionally or alternatively, some steps or sub-steps may be omitted; a plurality of steps or sub-steps may be merged into one step or sub-step to execute, and/or a step or sub-step may be decomposed into a plurality of steps or sub-steps to execute. For example, in some exemplary embodiments, the step of determining whether to perform release of memory space in step S101 is only required to occur prior to the step S106 of actually releasing the memory space, which may occur in any order or simultaneously with steps S102 to S105.

The method for managing memory space according to exemplary embodiments of the present invention is far more efficient than those disclosed in the prior art. It is substantively a two-layered paging mechanism, i.e., the pages are managed by a two-layered framework; wherein, according to exemplary embodiments of the present invention, a plurality of snapshots share a memory space quota.

Figure 3:
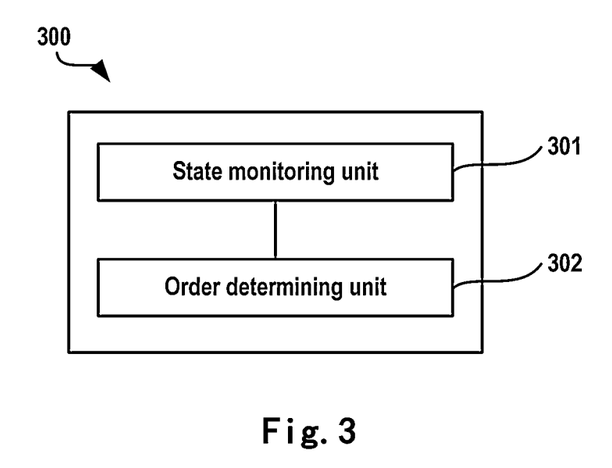
FIG. 3 is a block diagram of an apparatus for managing memory space according to an exemplary embodiment of the present invention.

Reference is now made to FIG. 3, a block diagram of an apparatus 300 for managing memory space according to an exemplary embodiment of the present invention. As mentioned previously, the memory space is organized into pages which are partitioned into a plurality of page sets, each page set being associated with one of a plurality of upper-layer systems. As illustrated in FIG. 3, the apparatus has a state monitoring unit 301 configured to perform state monitoring of the plurality of upper-layer systems to assign priorities to the plurality of upper-layer systems; and an order determining unit configured to determine an order of releasing the pages of the memory space based on the priorities of the plurality of upper-layer systems with the page sets as units.

According to some alternative embodiments, the apparatus 300 may further have an internal order determining unit configured for a page set associated with each of the upper-layer systems, and determining a release order within the page set based on the most recent usage situation of the pages in the page set.

According to some alternative embodiments, a plurality of page sets share a memory space quota. At this point, the apparatus 300 further has a release amount determining unit configured to determine the page release amount of each of the page sets based on the order of releasing the pages of the memory space. According to some alternative embodiments, the release amount determining unit has a release ratio determining unit configured to determine a ratio of released pages of each of the page sets to the memory space quota. According to some alternative embodiments, the apparatus may further have a threshold setting unit configured to set a threshold, such as a lower threshold and an upper threshold, for the memory space quota; and a usage amount comparing unit configured to determine the page release amount by comparing the memory space usage amount in each page set with the lower threshold and the upper threshold.

According to some alternative embodiments, the state monitoring unit has at least one of the following: a count monitoring unit configured to monitor snapshot count within a predetermined period; a consumption monitoring unit configured to monitor memory consumption of snapshots; and a QoS monitoring unit configured to monitor predefined QoS settings.

According to some alternative embodiments, the upper-layer systems may include file systems or virtual machine systems.

It should be understood that the apparatus 300 as described with reference to FIG. 3 may be configured to perform the method as described previously with reference to FIG. 1. Thus, various features as described previously with reference to FIG. 3 are likewise suitable for the apparatus, and these are not provided in detailed as such are understood by a person of reasonable skill in the art.

Besides, according to embodiments of the present invention, the apparatus 300 described with reference to FIG. 3 may be implemented in various different manners. For example, in some embodiments, the apparatus may be implemented using software, or the apparatus 300 may be implemented as a part of a data protection application or another software system that can be called by the application. At this point, each unit disclosed previously in the apparatus 300 may be implemented as a software module. Alternatively, the apparatus 300 may be implemented partially or completely based on hardware or a combination of software and hardware thereof. For example, the apparatus may be implemented as an integrated circuit (IC) chip or an application specific integrated circuit (ASIC), a field programmable gate array (FPGA), a system on chip (SOC), etc. At this point, various units of the apparatus may be implemented as hardware-based modules or elements. Other manners that are currently known or developed in the future are also feasible, and the scope of the present invention is not limited to those disclosed herein.

Figure 4:
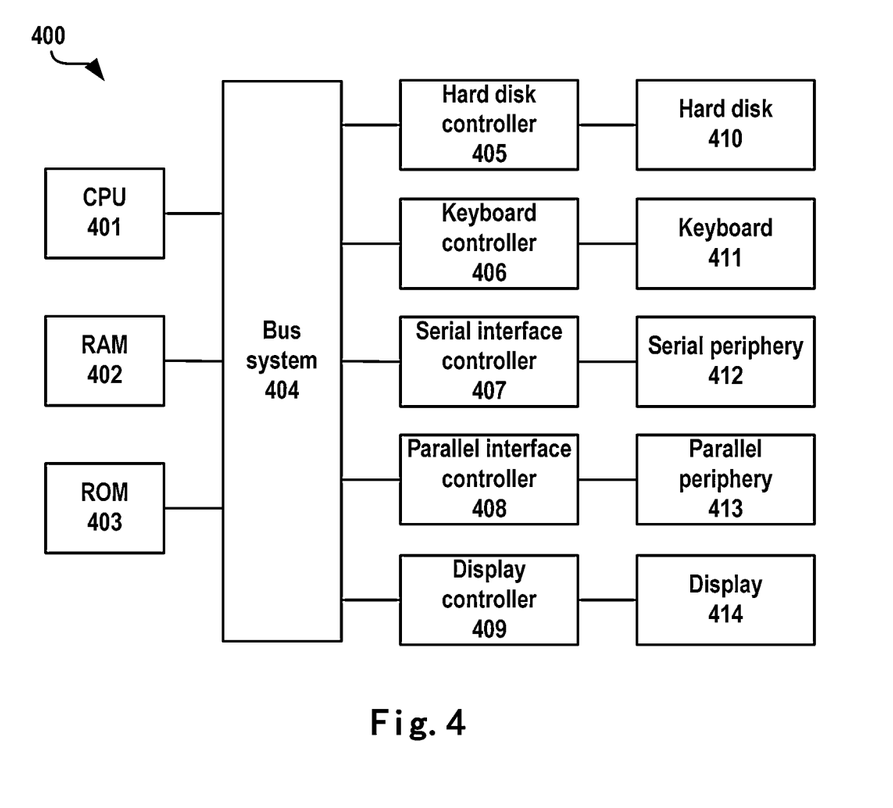
FIG. 4 shows a block diagram of a computer system that is applicable to implement the embodiments of the present invention.

Reference is now made to FIG. 4, which shows a schematic block diagram of a computer that is adapted to implement the embodiments of the present invention. As shown in FIG. 4, the computer 400 includes a CPU (Central Processing Unit) 401, a RAM (Random Access Memory) 402, a ROM (Read Only Memory) 403, a system bus 404, a hard disk controller 405, a keyboard controller 406, a serial interface controller 407, a parallel interface controller 408, a monitor controller 409, a hard disk 410, a keyboard 411, a serial peripheral device 412, a parallel peripheral device 413 and a monitor 414. Among these devices, connected to the system bus 404 are the CPU 401, the RAM 402, the ROM 403, the hard disk controller 405, the keyboard controller 406, the serial interface controller 407, the parallel interface controller 408 and the monitor controller 409. The hard disk 410 is coupled to the hard disk controller 405; the keyboard 411 is coupled to the keyboard controller 406; the serial peripheral device 412 is coupled to the serial interface controller 407; and the parallel peripheral device 413 is coupled to the parallel interface controller 408; and the monitor 414 is coupled to the monitor controller 409. It should be understood that the structural block diagram in FIG. 4 is shown only for purpose of illustration, and is not intended to limit the scope of the present invention in any sense. In some cases, some devices may be added or reduced as required.

As mentioned previously, the apparatus 300 may be implemented through hardware, for example, chip, ASIC, SOC, etc. Such hardware may be integrated or coupled into the computer 400. Besides, embodiments of the present invention may also be implemented in a form of a computer program product. For example, the method as described with reference to FIG. 1 may be implemented via a computer program product. This computer program product may be stored in RAM 402, ROM 403, hard disk 410 and/or any suitable storage medium, for example an optical or magnetic readable media as partially illustrated in FIG. 4, or downloaded to the computer 400 from a suitable location in a network or from the Internet. The computer program product may include computer code portions having program instructions that may be executed through a suitable processing device (for example, a processor or a CPU 401 as shown in FIG. 4). The program instruction at least may comprise instructions for implementing the method steps of the present invention.

It should be noted that embodiments of the present invention can be implemented in software, hardware or the combination thereof. The hardware part can be implemented by a dedicated logic; the software part can be stored in a memory and executed by a proper instruction execution system such as a microprocessor or a design-specific hardware. One of ordinary skill in the art may understand that the above-mentioned method and system may be implemented with a computer-executable instruction and/or in a processor controlled code, for example, such code is provided on a bearer medium such as a magnetic disk, CD, or DVD-ROM, or a programmable memory such as a read-only memory (firmware) or a data bearer such as an optical or electronic signal bearer. The apparatuses and their modules in the present invention may be implemented by hardware circuitry of a very large scale integrated circuit or gate array, a semiconductor such as logical chip or transistor, or a programmable hardware device such as a field-programmable gate array or a programmable logical device, or implemented by software executed by various kinds of processors, or implemented by combination of the above hardware circuitry and software such as firmware.

The communication network as mentioned in this specification may comprise various kinds of networks, including but not limited to local area network (LAN), wide area network (WAN), an IP-protocol based network (for example Internet), and a peer-to-peer network (for example ad hoc peer network).

It should be noted that although a plurality of units of the apparatuses have been mentioned in the above detailed depiction, such partitioning is merely non-compulsory. In actuality, according to embodiments of the present invention, the features and functions of two or more units above described may be embodied in one unit. On the contrary, the features and functions of one unit above described may be further partitioned to be embodied in more units.

Besides, although operations of the present methods are described in a particular order in the drawings, it does not require or imply that these operations must be performed according to this particular order, or a desired outcome can only be achieved by performing all shown operations. On the contrary, the execution order for the steps as depicted in the flowcharts may be varied. Additionally or alternatively, some steps may be omitted, a plurality of steps may be merged into one step for execution, and/or a step may be divided into a plurality of steps for execution.

Although the present invention has been depicted with reference to a plurality of embodiments, it should be understood that the scope of the present invention is not strictly be limited to the embodiments disclosed herein. On the contrary, the present invention intends to cover various modifications and equivalent arrangements included in the spirit and scope of the appended claims. The scope of the appended claims meets the broadest explanations and covers all such modifications and equivalent structures and functions.

What is claimed is:

1. A method for managing, memory space, the method comprising:
    monitoring a plurality of upper-layer systems using a memory space, wherein the memory space is organized into a plurality of pages, and each of the plurality of pages being further subdivided into a plurality of page sets and each page set of the plurality of page sets being associated with one of the plurality of upper-layer systems;
    assigning priorities to the plurality of upper-layer systems, wherein higher priorities are enabled to be assigned to upper-layer systems which perform operations more frequently;
    augmenting priorities of the plurality of upper-layer systems based on a snapshot weight of each of the upper-layer systems; and
    based on the priorities assigned to each of the plurality of upper-layer system, defining an order of release of the pages in the memory space, wherein usage of the memory space is enabled to be reduced by releasing of the pages in the memory space, wherein the releasing of the pages in the memory space is enabled to be executed at a rate based on whether usage of memory space has exceeded threshold amounts of usage.

2. The method as claimed in claim 1, wherein for each of the plurality of page sets,
    determining a release order within the page set based on a most recent usage situation of the pages in the page set.

3. The method as claimed in claim 2 further comprising:
    determining a page release amount for each of the page sets based on the order of release of the pages of the memory space.

4. The method as claimed in claim 3, wherein determining the page release amount comprises:
    determining a ratio between released pages of each of the page sets to the memory space quota.

5. The method as claimed in claim 3, further comprising:
    setting a threshold for the memory space quota; and
    determining the page release amount by comparing a memory space usage amount in each page set with the threshold.

6. The method as claimed in claim 5, wherein the threshold comprises an upper threshold and a lower threshold.

7. The method as claimed in claim 1, wherein the plurality of page sets share a memory space quota.

8. The method as claimed in claim 1, wherein monitoring the plurality of upper-layer systems comprises monitoring at least one of a snapshot count within a predetermined period or a memory consumption of the snapshots, or a predefined QoS parameter.

9. The method as claimed in claim 1, wherein the upper-layer systems comprise at least one of a file system or a virtual machine system.

10. A computer program product for managing memory space, the computer program product comprising:
a non-transitory computer readable medium encoded with computer-executable code, the code configured to enable the execution of:
monitoring a plurality of upper-layer systems using a memory space, wherein the memory space is organized into a plurality of pages, and each of the plurality of pages being further subdivided into a plurality of page sets and each page set of the plurality of page sets being, associated with one of the plurality of upper-layer systems;
assigning priorities to the plurality of upper-layer systems, wherein higher priorities are enabled to be assigned to upper-layer systems which perform operations more frequently;
augmenting priorities of the plurality of upper-layer systems based on a snapshot weight of each of the upper-layer systems; and
based on the priorities assigned to the upper-layer system, defining an order of release of the pages in the memory space, wherein usage of the memory space is enabled to be reduced by releasing of the pages in the memory space, wherein the releasing of the pages in the memory space is enabled to be executed at a rate based on whether usage of memory space has exceeded threshold amounts of usage.

11. The computer program product as claimed in claim 10, wherein the code is further configured to enable the execution of:
determining a release order within the page set based on a most recent usage situation of the pages in the page set, for the page set associated with the one of the upper-layer systems, and wherein the plurality of page sets share a memory space quota.

12. The computer program product as claimed in claim 11, wherein the code is further configured to enable the execution of:
determining a page release amount for each of the page sets based on the order of release of the pages of the memory space, and determining the page release amount further comprises:
determining, a ratio between released pages of each of the page sets to the memory space quota;
setting a threshold for the memory space quota; and
determining the page release amount by comparing a memory space usage amount in each page set with the threshold, wherein the threshold comprises a upper threshold and a lower threshold.

13. The computer program product as claimed in claim 10, wherein monitoring the plurality of upper-layer systems comprises monitoring at least one of a snapshot count within a predetermined period or a memory consumption of the snapshots, or a predefined QoS parameter, and wherein the upper-layer systems comprise at least one of a file system or a virtual machine system.

14. A System, comprising:
a data storage system including a memory space, wherein the memory space is organized into a plurality of pages, and each of the plurality of pages being further subdivided into a plurality of page sets and each page set being associated with one of a plurality of upper layer systems; and
computer-executable program logic encoded in memory of one or more computers enabled to manage memory space, wherein the computer-executable program logic is configured for the execution of:
monitoring the plurality of upper-layer systems;
assigning priorities to the plurality of upper-layer systems, wherein higher priorities are enabled to be assigned to upper-layer systems which perform operations more frequently;
augmenting priorities of the plurality of upper-layer systems based on a snapshot weight of each of the upper-layer systems; and
based on the priorities assigned to the upper-layer system, defining an order of release of the pages in the memory space, wherein usage of the memory space is enabled to be reduced by releasing of the pages in the memory space, wherein the releasing of the pages in the memory space is enabled to be executed at a rate based on whether usage of memory space has exceeded threshold amounts of usage.

15. The method as claimed in claim 14, wherein for each of the plurality of page sets associated with each of the upper-layer systems,
determining a release order within the page set based on a most recent usage situation of the pages in the page set.

16. The System as claimed in claim 15 wherein the computer-executable program logic is further configured for the execution of:
determining a page release amount for each of the page sets based on the order of release of the pages of the memory space.

17. The System as claimed in claim 16, wherein determining the page release amount comprises:
determining a ratio between released pages of each of the page sets to the memory space quota.

18. The System as claimed in claim 16, wherein the computer-executable program logic is further configured for the execution of:
setting a threshold for the memory space quota; and
determining the page release amount by comparing a memory space usage amount in each page set with the threshold.

19. The System as claimed in claim 18, wherein the threshold comprises an upper threshold and a lower threshold.

20. The System as claimed in claim 14, wherein the plurality of page sets share a memory space quota.

* * * * *